United States Patent
Choi et al.

(10) Patent No.: US 8,112,065 B2
(45) Date of Patent: Feb. 7, 2012

(54) MOBILE AUTHENTICATION THROUGH STRENGTHENED MUTUAL AUTHENTICATION AND HANDOVER SECURITY

(75) Inventors: Hyoung-Kee Choi, Seoul (KR); Chan-Kyu Han, Seoul (KR)

(73) Assignee: Sungkyunkwan University Foundation for Corporate Collaboration, Gyeonggi-Do (KR)

(*) Notice: Subject to any disclaimer, the term of this patent is extended or adjusted under 35 U.S.C. 154(b) by 1012 days.

(21) Appl. No.: 12/040,247

(22) Filed: Feb. 29, 2008

(65) Prior Publication Data

US 2009/0029677 A1    Jan. 29, 2009

(30) Foreign Application Priority Data

Jul. 26, 2007  (KR) .................. 10-2007-0075151
Aug. 9, 2007  (KR) .................. 10-2007-0080351

(51) Int. Cl.
*H04M 1/66* (2006.01)
(52) U.S. Cl. ..................... 455/411; 455/436
(58) Field of Classification Search .......... 455/410, 455/411, 436–444; 380/247–249, 270–274
See application file for complete search history.

(56) References Cited

U.S. PATENT DOCUMENTS

| | | | |
|---|---|---|---|
| 7,177,424 B1* | 2/2007 | Furuya et al. | 380/37 |
| 2004/0049675 A1* | 3/2004 | Micali et al. | 713/158 |
| 2004/0078571 A1* | 4/2004 | Haverinen | 713/168 |
| 2004/0258245 A1* | 12/2004 | Kusakabe et al. | 380/277 |
| 2005/0005093 A1* | 1/2005 | Bartels et al. | 713/150 |
| 2005/0079866 A1 | 4/2005 | Chen et al. | |

FOREIGN PATENT DOCUMENTS

| | | |
|---|---|---|
| KR | 1020030023124 A | 3/2003 |
| KR | 2004-0013966 | 2/2004 |
| KR | 1020060049718 A | 5/2006 |

OTHER PUBLICATIONS

Security Analysis and Enhancements of 3GPP Authentication and Key Agreement Protocol (IEEE Transactions on Wireless Communications, vol. A, No. 2, Mar. 2005, Muxiang Zhang, Yuguang Fang).
Efficient 3GPP Authentication and Key Agreement with Robust User Privacy Protection (IEEE Wireless Communications and Networking Conference (WCNC 2007), Wen-Shenq Juang, Jing-Lin Wu.
Office Action dated Aug. 28, 2009 for Korean Patent Application No. 10-2007-0080351.
Secure User Authentication Mechanism in Digital Home Network Environments, The 2006 IFIP International Conference on Embedded and Ubiquitous Computing (Aug. 31, 2006).

* cited by examiner

*Primary Examiner* — Lester Kincaid
*Assistant Examiner* — Daniel Lai
(74) *Attorney, Agent, or Firm* — James P. Muraff; Neal, Gerber & Eisenberg, LLP (57) ABSTRACT

A method of mobile authentication with enhanced mutual authentication and handover security is disclosed. The method of mutual authentication in a mobile network in accordance with an embodiment of the present invention includes: generating at least one service ticket and session key corresponding to a mobile station in accordance with an authentication data request for the mobile station; encrypting the service ticket and the session key by using a user security key pre-assigned in accordance with the mobile station; sending the encrypted service ticket and session key to the mobile station by using a control message; and authenticating the mobile station by analyzing user mutual authentication information received from the mobile station. The present invention, therefore, can provide a more powerful and effective mutual authentication method in a mobile network.

10 Claims, 5 Drawing Sheets

MOBILE AUTHENTICATION THROUGH STRENGTHENED MUTUAL AUTHENTICATION AND HANDOVER SECURITY

CROSS-REFERENCE TO RELATED PATENT APPLICATIONS

This application claims the benefit of Korean Patent Application Nos. 10-2007-0075151, filed on Jul. 26, 2007, and 10-2007-0080351, filed on Aug. 9, 2007, in the Korean Intellectual Property Office, the disclosure of which is incorporated herein in its entirety by reference.

BACKGROUND OF THE INVENTION

1. Field of the Invention

The present invention relates to a method and a system for mobile authentication, more specifically to a mobile authentication method and system through strengthened mutual authentication and handover security that are capable of providing an effective authentication algorithm, which takes a mutual authentication procedure for mobile stations and the mobility of a mobile station into consideration, on a mobile network.

By providing an effective and powerful authentication and security algorithm considering a variety of service scenarios, the mobile authentication system of the present invention is capable of maintaining the security against various harmful attacks.

2. Background Art

With the recent development of mobile communication technologies, the 3G service, which provides data and multimedia services as well as the voice service, is gaining the popularity.

With an explosive increase of 3G service subscribers, the authentication of verifying whether a user is legitimately authorized has become an increasingly important issue. At the same time, more studies have been conducted to encrypt the 3G service in order to inhibit unauthorized users from receiving the service.

Generally, the authentication and security of a mobile network provides a subscriber of a service the means for ensuring anonymity and privacy during a call and a mobile service provider the means for charging the correct customer.

As a part of studies on user authentication and encryption of the 3G service, the 3GPP ($3^{rd}$ Generation Partnership Project) Authentication and Key Agreement standard (IEEE TS 33.102) has been proposed. In addition, there have been a number of studies on the weakness of the 3GPP AKA and possible attacks against the AKA as well as methods for addressing these issues.

A Korean patent, the publication number of which is 2004-0013966, filed for application on Aug. 9, 2002, is about authentication for an electronic commerce information protection. More specifically, it discloses a method of authentication and key agreement on a mobile communication network that is suitable for efficiently performing the authentication and key agreement between a service provider and a user having a mobile station.

Although the publication number 2004-0013966 proposed an authentication mechanism utilizing an open-key-based system, this mechanism is not expansible since the widely used 3GPP AKA.

In "Security Analysis and Enhancements of 3GPP Authentication and Key Agreement Protocol" (IEEE Transactions on Wireless Communications, Vol. 4, No. 2, March 2005, Muxiang Zhang, Yuguang Fang), a possible attack scenario in 3GPP AKA and an authentication mechanism of AP-AKA, which is an authentication mechanism for addressing the pertinent attack, are disclosed.

In the above reference ("Reference [1]", hereinafter), Zhang et al. points out a vulnerability of 3GPP AKA against a false base station, and suggests the AP-AKA as a solution for this vulnerability.

The false base station uses the vulnerability of AKA, in which the user can not authenticate the network, to interrupt a normal authentication such that the authentication is not made on a network intended by the user, and makes the authentication completed in a network intended by the adversary.

Zhang indicates a redirection attack and an active attack in a corrupted network, as some of the possible attacks by an interruption of the false base station in the conventional AKA.

The redirection attack occurs when the false base station snatches an authentication request by a mobile station to redirect a call to a network with a low security level or high service charges that does not perform an encryption.

Therefore, through the redirection attack, not only can the false base station tap into the communication information of the mobile station, but also the false base station can reconfigure the communication route to excessively charge the mobile station.

Fundamentally, the redirection attack occurs because the mobile station is not able to authenticate the network that has transmitted the authentication request.

The active attack in a corrupted network presumes that the corrupted network, which is controlled by an adversary, has an extra copy of an authentication vector (AV) that a mobile station has already obtained.

In case a normal network transmits an authentication request message to a mobile station, the false base station obtains an AV corresponding to the mobile station from the corrupted network and transmits an element of the AV to the mobile station.

As the mobile station is unable to authenticate the network that has sent the authentication request, the mobile station re-uses the AV generated by the corrupted network. Since the AV obtained from the corrupted network is already exposed to the adversary, the adversary is able to tap the communication information of the mobile station.

In the description below, a solution suggested by Reference [1] for each of the above attack scenarios will be described in detail.

The AP-AKA, proposed through Reference [1], provides a method for addressing the redirection attack and the active attack in a corrupted network, as described above.

The AP-AKA uses $ID_{SN}$ to address the redirection attack. $ID_{SN}$ is an identifier assigned in accordance with IMSI of a mobile station in order to identify a visiting location register of a serving network ("VLR/SN", hereinafter) that the mobile station accessed.

A home location register located in a home network ("HLR/HN", hereinafter) receives a VAC through an authentication data request message. The VAC is obtained from the mobile station through a user data request process and includes the $ID_{SN}$. The user data request process consists of a step of the VLR/SN sending a user data request message to the mobile station and a step of the mobile station sending a user data response message to the VLR/SN.

If the $ID_{SN}$ included in the VAC and the $ID_{SN}$ of the VLR/SN that sent the authentication data request message are different, the HLR/SN may determine that a redirection attack has occurred.

The AP-AKA also uses an RN (Random Number) to address the active attack in a corrupted network scenario. The RN is a random value selected by the mobile station and changes every time the VLR/SN makes an authentication request. The RN is obtained from the mobile station through the user data request process.

The RN included in an AV generated by the corrupted network can be different from the RN sent by the mobile station through the user data response message. Therefore, the mobile station can recognize that the active attack in a corrupted network has occurred, through an $RN_{idx}$ included in AUTH.

The mobile station can obtain the AUTH value through a user authentication request message.

"Efficient 3GPP Authentication and Key Agreement with Robust User Privacy Protection" (IEEE Wireless Communications and Networking Conference (WCNC 2007), Wen-Shenq Juang, Jing-Lin Wu; "Reference [2]", hereinafter) points out that the AP-AKA proposed by Reference [1] is vulnerable against a location privacy attack, a space overhead on VLR and a higher bandwidth consumption between HLR and VLR, and presents an Efficient-AKA protocol as a solution for the above three vulnerability problems.

Although the above references are most widely studied as an authentication method that is improved from the IEEE mobile network authentication standard of 3GPP-AKA, they are only capable of addressing the presented attack scenarios. Consequently, the disclosed authentication mechanism is unable to effectively address a combined attack scenario.

As such, the conventional authentication methods and systems are not only vulnerable against a false base station but also have authentication flaws between networks during the transfer of user authentication information.

Therefore, not only is the conventional authentication system unable to provide a reliable authentication service but also is incapable of properly addressing malicious attacks of an adversary through a false base station.

SUMMARY OF THE INVENTION

Contrived to solve the above problems of the conventional technology, the present invention provides a method of mutual authentication on a mobile network using Kerberos that provides a mutual authentication process between the mobile network and a mobile station in order to block the source of illegal access through a false base station.

The present invention also provides a faster and more powerful authentication service using a Kerberos algorithm during handover.

An aspect of the present invention features a method of mutual authentication in a mobile network.

The method of mutual authentication in a mobile network in accordance with an embodiment of the present invention can include: generating a service ticket and a session key corresponding to a mobile station in accordance with an authentication data request for the mobile station; encrypting the service ticket and the session key by using a user security key pre-assigned in accordance with the mobile station; sending the encrypted service ticket and session key to the mobile station by using a control message; and authenticating the mobile station by analyzing user mutual authentication information received from the mobile station.

Another aspect of the present invention features a method of mutual authentication in a mobile station.

The method of mutual authentication in a mobile network in accordance with an embodiment of the present invention can include: sending to a base station a user data response message including a subscriber identifier, if a user data request message is received from the base station; receiving from the base station a user authentication request message including at least one service ticket and session key encrypted with a user security key; decoding the service ticket and session key by using the pre-stored user security key; and sending to the base station a user authentication response message including a random value (nonce), a random value ($E_{SK}$(nonce)) encrypted with the decoded session key, and the decoded service ticket. If a random value is received from the base station, a mobile communication system is authenticated by comparing the sent random value with the received random value.

BRIEF DESCRIPTION OF THE DRAWINGS

These and other features, aspects and advantages of the present invention will become better understood with regard to the following description, appended Claims and accompanying drawings where:

DESCRIPTION OF CERTAIN INVENTIVE EMBODIMENTS

Prior to describing an embodiment of the present invention, the Kerberos authentication system, which is the technical foundation of the present invention, will be described.

Developed as a part of the Athena Project by the Massachusetts Institute of Technology, the Kerberos authentication system allows a reliable third computer to authenticate a client that desires to use a particular service.

Through the authentication, a server can verify whether the client is a legitimate user, and then the server and client can engage in secure communication through a connected session.

A Kerberos protocol is based on the concept of ticket, which is an encrypted data packet issued by a reliable authentication organization, called the key distribution center (KDC).

The ticket can be used for the purpose of guaranteeing user identification information, and the KDC provides the ticket to every user within the range or region of the authentication organization.

In general, Kerberos can address the following security threats.

Firstly, in case an illegal user accesses a server and pretends as if another legitimate user is using the server, Kerberos can block the illegal user from accessing the server.

Secondly, in case an illegal user pretends as if a request sent to a server is originated from another legitimate workstation by changing the network address of a workstation of the illegal user to a legitimate address, Kerberos can block the illegal user from accessing the server.

Thirdly, Kerberos can block an illegal user from tapping into communication information between a legitimate user and a server and requesting the server to resend the communication information.

Hereinafter, the principle of how Kerberos works will be described with reference to FIG. 1.

Figure 1:
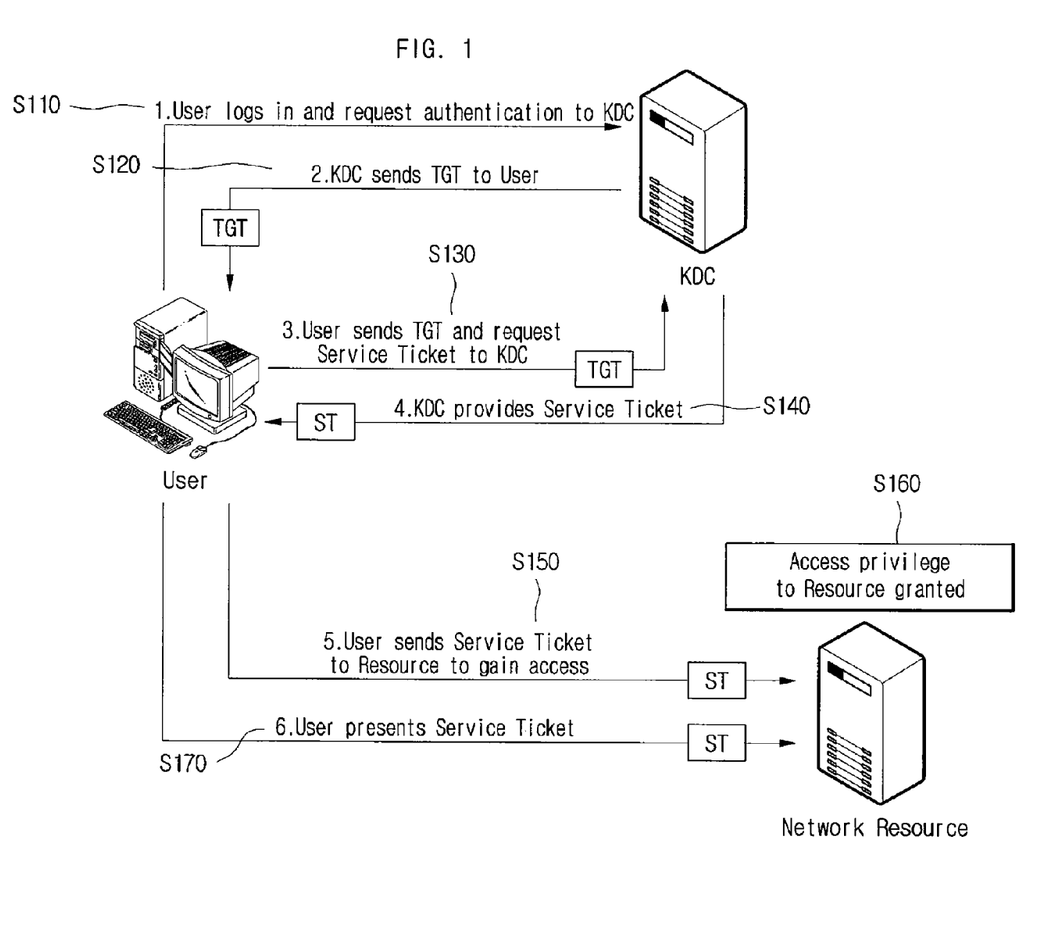
FIG. 1 shows a basic process of a Kerberos protocol.

FIG. 1 shows a basic process of a Kerberos protocol.

Referring to FIG. 1, when a user attempts to log in through an application program, such as Telnet and FTP (File Transfer Protocol), a user computer requests authentication to a KDC, which provides a TGT (Ticket Granting Ticket) in the step represented by S110.

The KDC generates the TGT in accordance with the authentication request and provides the generated TGT to the pertinent user computer, in the step represented by S120.

In case the user wants to use a particular network resource (e.g. a server providing a particular service), the user computer sends a service ticket request signal, including the received TGT, to the KDC, in the step represented by S130.

The KDC sends a service ticket corresponding to the network resource to the user computer, in the step represented by S140.

The service ticket is written with a transmission date and a transmission time, and another service can be requested using the same service ticket without re-authentication for a predetermined period.

That is, by issuing the service ticket to be valid for a limited period, the KDC can prevent an illegal user from using the service ticket as is after the predetermined period.

The user sends the received service ticket to the network resource in order to obtain an access privilege to the network resource, in the step represented by S150.

If the received service ticket is valid, the network resource grants the user the access privilege to the network resource, in the step represented by S160.

If the user wants to use the network resource later, the user can simply present the service ticket, in the step represented by S170.

Figure 2:
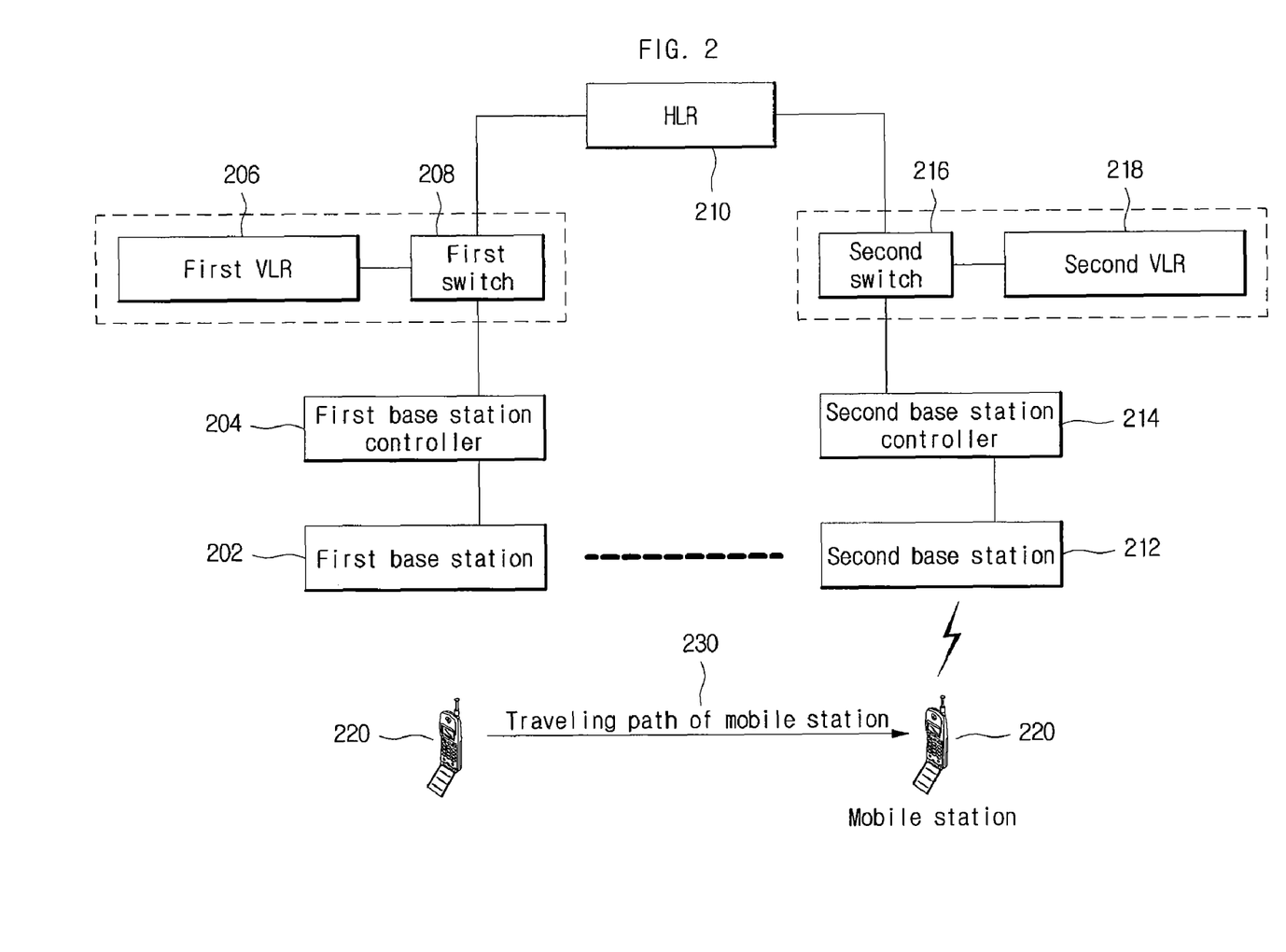
FIG. 2 shows a mobile network in accordance with an embodiment of the present invention.

FIG. 2 is a mobile network in accordance with an embodiment of the present invention.

Referring to FIG. 2, a typical mobile network system can generally include base stations 202 and 212, base station controllers 204 and 214, switches 208 and 216, visitor location registers (VLR) 206 and 218, and a home location register 210.

Although it is possible that other various elements not shown in FIG. 2 can be included in a mobile network system, it shall be noted that FIG. 2 only shows the elements that are necessary for describing the technical ideas of the present invention.

The HLR 210 stores a master database of all subscribers of the network, and can provide the subscriber information to the elements of the network.

The subscriber information can include location information of the mobile station, terminal status information, service sign-up information, addition service information, and route information.

In addition, the HLR 210 can receive, in real time or periodically, information stored in the VLRs 206 and 218 and stores the received information in the internal database, and can provide the route information of a terminating terminal on the network in accordance with a request of the switch. The route information can include the information on the switch where the terminating terminal is located and on the address of the VLR.

The HLR 210 of the present invention can generate a security key value and provide the generated security key value to a mobile station 220 and the VLRs 206 and 218.

The HLR 210 can provide an authentication service on the mobile station through liking with an Authentication Center.

The HLR 210 can share the security key, generated while building the network, with the VLRs 206 and 218. On the other hand, the HLR 210 can generate the security key while a service is requested or signed up, and provide the security key to the mobile station 220.

A first switch 208 and a second switch 216, shown in FIG. 2, can include a packet switch exchange, such as a SGSN (Serving GPRS (General Packet Radio Service) Support Node) in a WCDMA (Wideband Code Division Multiple Access) system, and a circuit switch exchange, such as a MSC (Mobile Switching Center) in a WCDMA system.

In general, the switches 208 and 216 can perform call processing, billing data generation and switching for the mobile station.

In addition, the switches 208 and 216 can obtain location registration information of the mobile station and store the obtained location registration information in the VLRs 206 and 218. In WCDMA, the location registration information can include location information in units of LA (location area), RA (routing area), URA (UTRAN registration area) and/or cell.

In other words, the switches 208 and 216 can obtain the real-time location information of the moving mobile station through a location registration message.

The HLR 210 may be overloaded with location registration information received from a large number of switches distributed in a wide area.

To solve this problem, the HLR 210 can perform a location registration process for the mobile station, if the mobile station changes its switch location or the status of the mobile station is changed.

In a WCDMA system, for example, the mobile station can change its switch location through an LAU (location area update) process and/or an RAU (routing area update) process.

The VLRs 206 and 218 can perform the functions of detailed location information update, location information registration, paging, and security for the mobile station that is accessed to the switch, and maintain a copy of subscriber information in the switch domain.

For instance, the VLRs 206 and 218 can store relatively detailed location information of the mobile station in units of cell, base station, and/or base station controller.

Although the switch and VLR have been physically separated in the 2G mobile communication system, it shall be noted that the switch and VLR can be placed at the same location in the 3G mobile communication system.

In case an authentication data request message including an International Mobile Subscriber Identity (IMSI) is received from the VLRs 206 and 218, the HLR 210 in accordance with an embodiment of the present invention can determine through the received IMSI whether the mobile station is registered in a service of the network.

If the mobile station is registered, the HLR 210 can generate a service ticket ("TICKET" hereinafter) and a session key ("SK" hereinafter).

The generated TICKET and SK are encrypted as a user security key ("$K_m$" hereinafter) and sent to the corresponding VLR. The $K_m$ is a security key shared between the HLR 210 and mobile station 220.

The TICKET can be generated by encrypting the SK as a network security key ("$K_v$" hereinafter). The $K_v$ is a security key shared in the step of building a network between the HLR 210 and the 206 and 218. It can be summed that the TICKET can be encrypted in accordance with an equation of TICKET=$E_{K_v}$(SK).

The VLR sends the information encrypted with $K_m$ to the mobile station. It shall be noted here that the VLR cannot decode the encrypted information because the TICKET and SK are encrypted with the security key $K_m$.

Therefore, it is not possible for any element, other than the HLR 210, of the mobile communication system and any false base station to obtain the TICKET and SK assigned to the mobile station.

Figure 3:
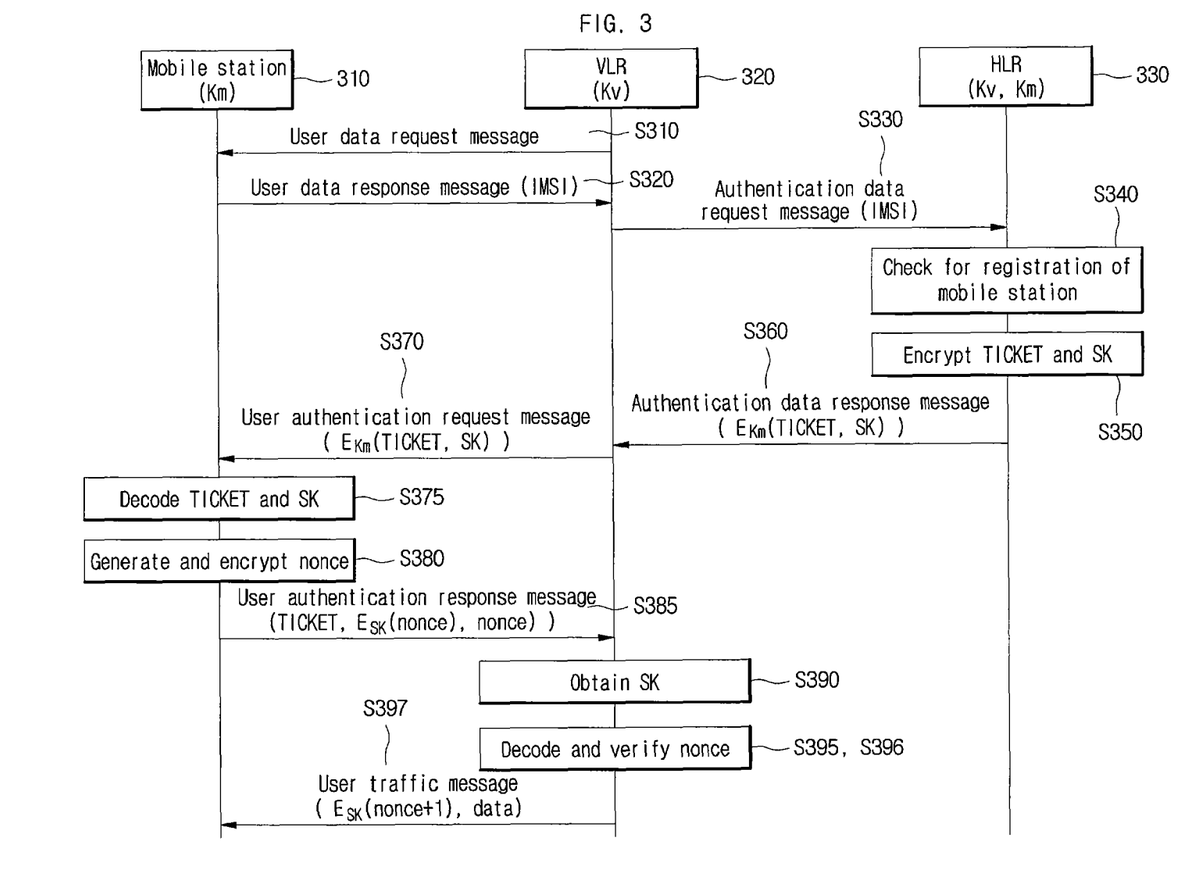
FIG. 3 shows a mutual authentication process on a mobile network in accordance with an embodiment of the present invention.

FIG. 3 shows a mutual authentication process in a mobile network in accordance with an embodiment of the present invention.

In the below description, the mutual authentication method in a mobile network in accordance with an embodiment of the present invention will be referred to as a "Kerberos-AKA authentication method", for the convenience of description.

As shown in FIG. 3, an HLR 330, located in a home network, maintains a user security key $K_m$ and a network security key $K_v$ in a storage area.

A VLR 320 is assigned with the network security key $K_v$ from the HLR 330 while the network is built and stores the network security key $K_v$ in a storage area. On the other hand, a mobile station 310 can be assigned with the user security key $K_m$ from the HLR 330 when a service is signed up or a services is requested in real time and store the user security key $K_m$ in a storage area.

Referring to FIG. 3, the VLR 320 sends a user data request message to the mobile station 310 in the step represented by S310, if the mobile station 310 approaches its service area.

When the user data request message is received, the mobile station 310 reads an IMSI stored in a USIM and sends a user data response message, including the read IMSI, to the VLS 320, in the step represented by S320.

Once the user data response message is received, the VLR 320 sends an authentication data request message, including the received IMSI, to the HLR 330, in the step represented by S330.

The HLR 330 determines whether the mobile station 310, corresponding to the received IMSI, is registered in a service in the network, in the step represented by S340.

If the mobile station is determined to be registered, the HLR 330 generates TICKET and SK corresponding to the IMSI and encrypts the generated TICKET and SK with $K_m$, in the step represented by S350.

In the step represented by S360, the HLR 330 sends an authentication data response message, including the encrypted message, which includes TICKET and SK, in the step S350, to the VLR 320.

The VLR 320 sends a user authentication request message, which includes the encrypted TICKET and SK without any process, to the mobile station 310, in the step represented by S370. Here, the TICKET and SK require no special process because the TICKET and SK are encrypted with $K_m$ and thus the encrypted information cannot be decoded.

In the step represented by S375, the mobile station 310 can decode SK and TICKET, which has been encrypted with $K_m$, using a pre-stored user security key $K_m$.

In S380, the mobile station 310 encrypts a random value selected by the mobile station (hereinafter referred to as "nonce"), using the decoded SK. Then, the mobile station 310 sends a user authentication response message, including encrypted nonce (i.e. $E_{SK}$(nonce)), unencrypted nonce, and TICKET values, to the VLR 320, in S385.

It shall be noted here that the encrypted TICKET cannot be decoded by using the network security key $K_v$ since the mobile station 310 does not know $K_v$.

In S390, the VLR 320 can obtain SK, using the pre-stored network security key $K_v$ and TICKET, which has been received in the above step S385. Then, the VLR 320 decodes the encrypted nonce, using the obtained SK, in S395.

In S396, the VLR 320 determines whether the decoded nonce and the unencrypted nonce, which has been received in S385, are identical, in S396.

If the two values are determined to be identical, the VLR 320 adds 1 to the decoded nonce and encrypts this value with SK. Then, the VLR 320 piggy bags this encrypted nonce (i.e. $E_{SK}$(nonce+1)) with user traffic and sends the encrypted nonce to the mobile station 310, in S397.

Through the above steps of S310 to S397, the Kerberos-AKA authentication method of the present invention enables the mutual authentication between the VLR 320 and mobile station 310.

Below, a method of authenticating the VLR 320 by the mobile station 310 and a method of authenticating the mobile station 310 by the VLR 320 will be described in more detail.

The mobile station 310 authenticates the VLR as follows.

The mobile station 310 sends the SK-encrypted nonce to the VLR 320 through the user authentication response message in the above-described step of S385. Here, the user authentication response message includes the TICKET value, which was received in S370.

The VLR 320 can obtain SK through $K_v$, which is shared with the HLR 330, and TICKET, and can decode nonce, which is sent by the mobile station 310, by using the obtained SK.

Then, when the VLR 320 sends to the mobile station 310 the nonce value, in which 1 is added to the decoded nonce, the mobile terminal 310 determines whether the nonce value that is added with 1 to the sent nonce value is identical to the nonce value received from the VLR 320.

If the two values are determined to be identical, the mobile station 310 determines that the corresponding VLR has normally performed a security key negotiation with the HLR.

The VLR 320 authenticates the mobile station 310 as follows.

When the mobile station 310 sends the user authentication response message, the VLR 320 can obtain SK by decoding TICKET, which has been encrypted with $K_v$. Then, the VLR 320 compares the unencrypted nonce value, which is included in the user authentication response message, with a value obtained by decoding the SK-encrypted nonce value (i.e. $E_{SK}$(nonce)).

If the two values are determined to be identical, the VLR 320 can authenticate the mobile station 310 as a legitimate terminal since the mobile station 310 has SK.

Figure 4:
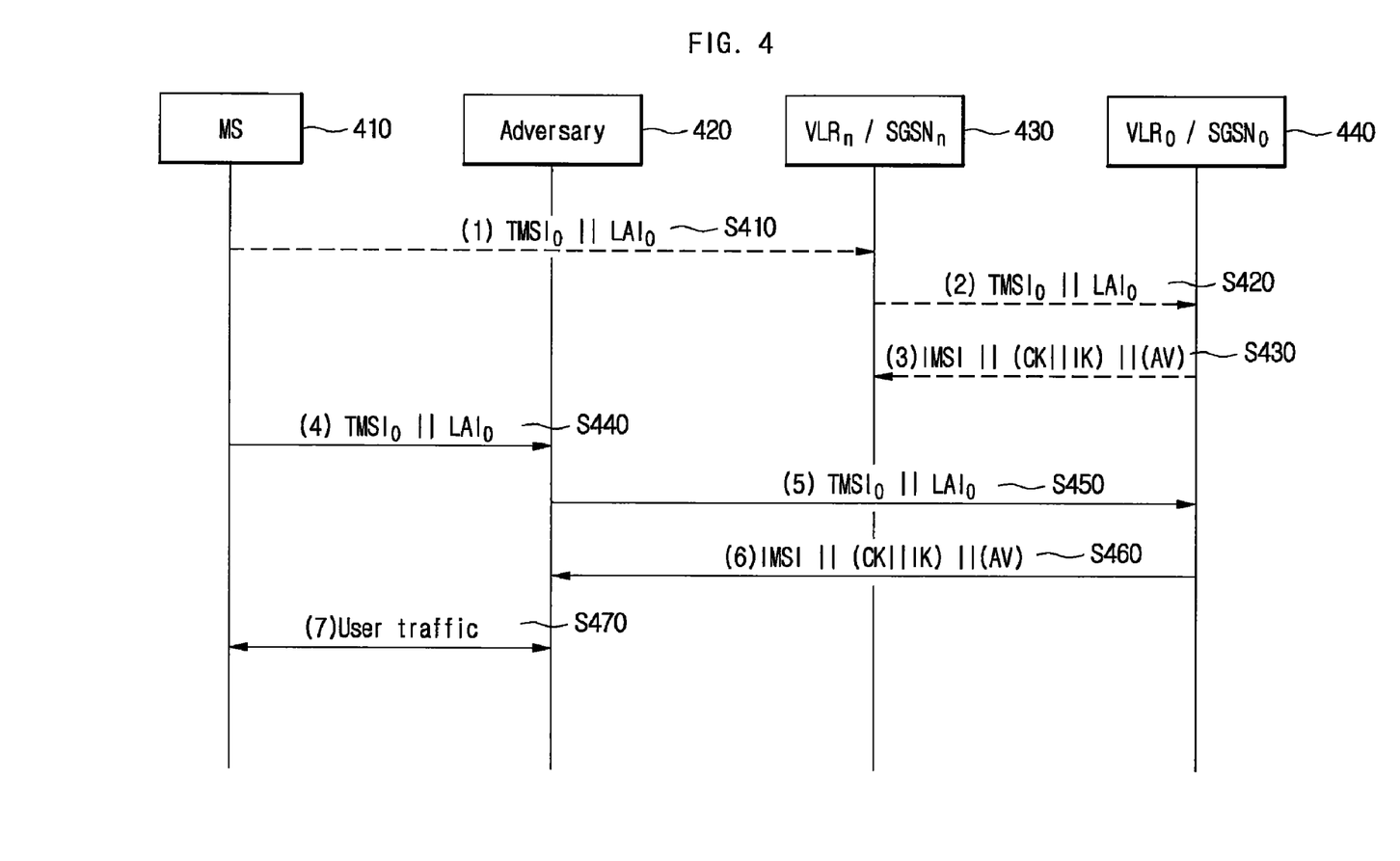
FIG. 4 shows a scenario of handover attack in the 3GPP AKA standard.

FIG. 4 is a scenario of a handover attack in the 3GPP AKA standard.

In the current 3GPP AKA standard, when a mobile station moves to a new VLR/SN, the mobile station does not go through a new process of authenticating with the HLR/HN, but new authentication information is sent to a new VLR/SN from the last VLR/SN.

Hereinafter, a 3GPP AKA authentication process for handover will be described in detail with reference to FIG. 4.

In the step represented by S410, a mobile station (MS) 410 sends a TMSI (temporary mobile subscriber identifier) and an LAI (location area identifier), obtained through an old VLR/SN 440 (hereinafter referred to as "$VLR_o/SN_o$"), to a new VLR/SN 430 (hereinafter referred to as "$VLR_n/SN_n$"). Here, the LAI is a location information identifier for $VLR_o/SN_o$ 440.

The $VLR_n/SN_n$ 430 obtains through the received LAI a transfer route to $VLR_o/SN_o$ 440 and then transmits the TMSI and LAI, received in S410, to $VLR_o/SN_o$ 440 through the obtained route, in S420.

In S430, the $VLR_o/SN_o$ 440 extracts an IMSI value corresponding to the received TMSI and then sends to the $VLR_n/$ $SN_n$ 430 at least one selected from the group consisting of the extracted IMSI, a ciphering key (CK), an integrity key (IK), and an authentication vector (AV) that is not currently used.

If there were no mutual authentication process between the VLR/SNs when the AV is transmitted between the $VLR_o/SN_o$ 440 and $VLR_n/SN_n$ 430, an adversary 420 would be able to obtain IMSI, CK, IK, and AV of the MS, through the steps of S440 to S470 shown in FIG. 4, and tap into the user information.

In the case of a 4 G communication system, which is based on an ALL-IP network, the key elements of the network may communicate through IP networks, not through a dedicated network. Therefore, the adversary can easily access the IP network and tap into the security information exchanged between the VLR/SNs.

Here, the key elements of the network can include an MSC, an SGSN, a VLR, and an HLR.

Therefore, it is important that a mutual authentication process designed to address the 3G and 4G networks be implemented between the key elements of the network.

Figure 5:
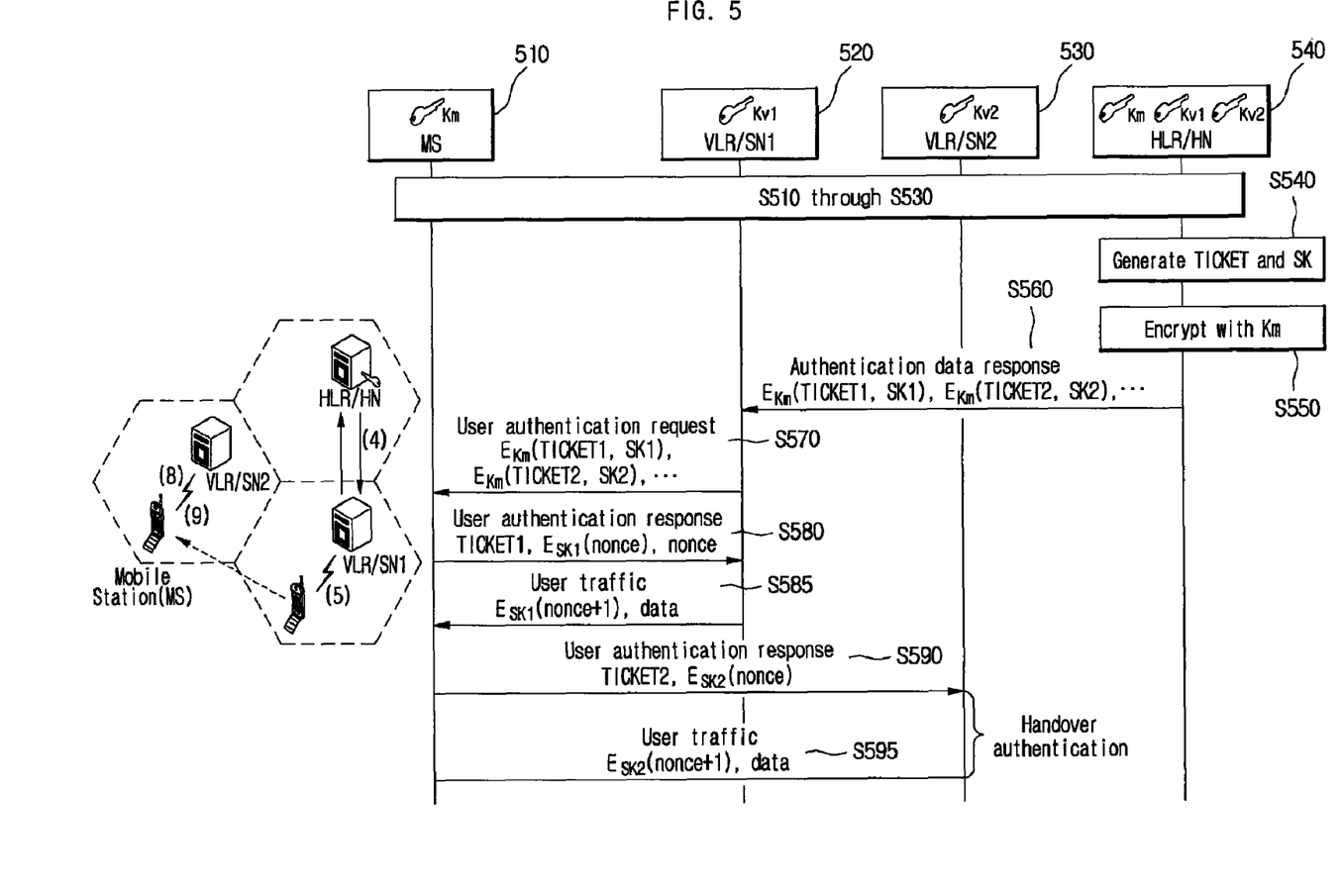
FIG. 5 shows a mutual authentication process for handover in accordance with an embodiment of the present invention.

FIG. 5 shows a mutual authentication process for handover in accordance with an embodiment of the present invention.

As described with reference to FIG. 4, the AKA defined in the 3GPP standard does not have a mutual authentication process between VLR/SNs, and thus an adversary could easily obtain security and authentication information, which include IMSI, CK, IK, and/or AV, and tap into call information of a user.

FIG. 5, therefore, presents a handover process using the Kerberos-AKA that is capable of providing a powerful security and authentication service for handover also, by partially modifying the Kerberos-AKA algorithm shown in FIG. 3.

Referring to FIG. 5, the steps represented by S510 through S530 are the same as the steps represented by S310 through S330 of FIG. 3, and thus will be omitted here.

In case an authentication date request message, including an IMSI, is received from a first VLR/SN 520, an HLR 540 generates a TICKET and a SK for each of the first VLR/SN 520 and at least one of VLR/SNs (a second through Nth VLR/SNs) for handover that is near the current location of a mobile station 510, in S540.

In S550, the HLR 540 encrypts the TICKET and SK, which is generated for each VLR/SN, with a pre-assigned user security key $K_m$ in accordance with the mobile station 510. Then, the HLR 540 sends an authentication data response message, including the encrypted information, to the first VLR/SN 520, in S560.

In the below description, the TICKET and SK corresponding to the first VLR/SN will be referred to as "TICKET1" and "SK1", respectively.

In S570, the first VLR/SN 520 sends the received encrypted information to the mobile station 510 through a user authentication request message.

In S580, the mobile station 510 sends nonce ($E_{SK1}$(nonce)), which is encrypted with a random value (nonce), TICKET1, and SK1, to the first VLR/SN 520.

The first VLR/SN 520 can extract SK1 by using the pre-assigned $K_{v1}$ and TICKET1 and obtain the nonce value by decoding the $E_{SK1}$(nonce) received from the mobile station 510 by using the extracted SK1.

If the nonce value and the nonce value decode using SK1 are identical, the first VLR/SN 520 can determine that the mobile station 510 is normally registered.

In S585, if the mobile station 510 is determined to have been normally registered, the first VLR/SN 520 encrypts what 1 is added to the obtained nonce value with SK1 (i.e. $E_{SK1}$(nonce+1)) and sends to the mobile station 510.

If the mobile station 510 moves to a second VLR/SN 530, which is included in possible handover VLR/SNs, the mobile station 510 sends a nonce value ($E_{SK2}$(nonce+1)) encrypted with TICKET2 and SK2, corresponding to TICKET and SK, respectively, for the second VLR/SN 530, to the second VLR/SN 530 through a user authentication response message, in S590.

It is imperative that the nonce value used in the step of S590 and the nonce value used in the step of S580 be different.

Here, it shall be noted that TICKET2 is encrypted with a network security key $K_{v2}$, shared between the HLR 540 and the second VLR/SN 530. That is, TICKET2 can be encrypted by using the mathematical formula of TICKET2=$E_{Kv2}$(SK2).

Therefore, the second VLR/SN 530 can obtain SK2 through the pre-stored $K_{v2}$, and obtain the nonce value generated by the mobile station 510 by using the obtained SK2.

In S595, the second VLR/SN 530 encrypts what 1 is added to the obtained nonce value with SK2 and sends to the mobile station 510 through a user traffic message.

Here, the mobile station 510 compares whether the nonce value sent in the above step of S590 is identical to the nonce value received from the second VLR/SN 530.

If the two nonce values are identical, the mobile station 510 can determine that the second VLR/SN 530 is a normal network element.

As described above, the Kerberos-AKA in accordance with an embodiment of the present invention sends the TICKET[1, ..., m] and SK[1, ..., m] information for the VLR/SN near the mobile station (that is, a nearby VLR/SN that has a possibility of the mobile station to handover) prior to the handover, not requiring to authenticate with the HLR during the handover.

Since the VLR 520 or 530 is usually located further away from the HLR than between the VLRs 520 and 530, the authentication time can be faster for the VLR 520 or 530 if the authentication is not made with the HLR 540.

In addition, the Kerberos-AKA in accordance with an embodiment of the present invention can better safeguard the user's personal information, since the authentication information for the mobile station is not sent or received between the VLRs during the handover, which is rather attempted through the use of the pre-received TICKET[1, ..., m] and SK[1, ..., m].

Therefore, the mobile station 510 can perform a faster, safer handover.

Although certain embodiments have been described, it shall be evident to anyone who is skilled in the art to which the present invention pertains that there can be a variety of permutations and modifications within the technical ideas and scope of the invention, which shall only be defined by the appended claims.

What is claimed is:

1. A method of mutual authentication in a mobile network, the method comprising:
    generating at least one service ticket and session key corresponding to a mobile station in accordance with an authentication data request for the mobile station;
    encrypting the service ticket and the session key by using a user security key pre-assigned in accordance with the mobile station;
    sending the encrypted service ticket and session key to the mobile station by using a control message; and
    authenticating the mobile station by analyzing user mutual authentication information received from the mobile station, wherein the user mutual authentication information includes the service ticket, an unencrypted random value (nonce) and a random value ($E_{SK}$(nonce)) encrypted with the session key (SK);

wherein the step of authenticating comprises:

obtaining the session key from the service ticket;

decoding the encrypted random value by using the obtained session key; and comparing whether the unencrypted random value is identical to the decoded random value.

2. The method of claim 1, wherein, in the step of encrypting, the service ticket (TICKET) uses a pre-assigned network security key ($K_v$) and the session key (SK) to perform the encryption in accordance with mathematical formula TICKET=$E_{K_v}$(SK).

3. The method of claim 2, wherein the mobile network comprises a home location register and a visiting location register, and the network security key is assigned by the home location register of a home network for each visiting location register and is shared between the home location register and the visiting location register when the network is formed.

4. The method of claim 1, wherein, in case the unencrypted random value is identical to the decoded random value, a value added by 1 to the unencrypted random value (nonce) is encrypted with the session key (SK) in accordance with mathematical formula $E_{SK}$(nonce+1) and is sent to the mobile station.

5. A method of mutual authentication in a mobile network, the method comprising:

sending to a base station a user data response message including a subscriber identifier, when a user data request message is received from the base station;

receiving from the base station a user authentication request message including at least one service ticket and session key encrypted with a user security key;

decoding the service ticket and session key by using the pre-stored user security key; and sending to the base station a user authentication response message including a random value (nonce), a random value ($E_{SK}$(nonce)) encrypted with the decoded session key, and the decoded service ticket, wherein, when a random value is received from the base station, a mobile communication system is authenticated by comparing the sent random value with the received random value, in case handover to a target visiting location register is needed:

sending a random value encrypted with a service ticket and a session key to the target visiting location register by using a control message; and when a random value generated by the target visiting location register is received, comparing the random value sent in the above-step with the received random value.

6. The method of claim 5, wherein the user security key is shared between the mobile communication system and the mobile station when a service is signed up.

7. The method of claim 5, wherein, in the step of receiving the user authentication request message, the service ticket is encrypted using a pre-assigned network security key ($K_v$) and the session key (SK) in accordance with mathematical formula TICKET=$E_{K_v}$(SK).

8. The method of claim 7, wherein the network security key is assigned by a home location register of a home network for each visiting location register and is shared between the home location register and the visiting location register when the network is formed.

9. The method of claim 5, wherein if the random value is received from the base station, the random value is encrypted in accordance with the mathematical formula $E_{SK}$(nonce+1) before sending the random value from the base station.

10. A recorded medium tangibly embodying a program of instructions executable by a mobile network system to execute a method of mutual authentication in a mobile network, the program being readable by the mobile network system, the program executing:

generating at least one service ticket and session key corresponding to a mobile station in accordance with an authentication data request for the mobile station;

encrypting the service ticket and the session key by using a user security key pre-assigned in accordance with the mobile station;

sending the encrypted service ticket and session key to the mobile station by using a control message; and authenticating the mobile station by analyzing user mutual authentication information received from the mobile station;

wherein the user mutual authentication information includes the service ticket, an unencrypted random value (nonce) and a random value ($E_{SK}$(nonce)) encrypted with the session key (SK);

wherein the step of authenticating comprises;

obtaining the session key from the service ticket;

decoding the encrypted random value by using the obtained session key; and comparing whether the unencrypted random value is identical to the decoded random value.

* * * * *